United States Patent
Nakazawa et al.

[11] Patent Number: 6,129,827
[45] Date of Patent: Oct. 10, 2000

[54] PROCESS AND APPARATUS FOR FORMING FLUORESCENT LAYER ON A SUBSTRATE FOR DISPLAY PANEL

[75] Inventors: Akira Nakazawa; Nobuhiro Iwase; Keiichi Betsui; Akihiro Mochizuki, all of Kawasaki, Japan

[73] Assignee: Fujitsu Limited, Kawasaki, Japan

[21] Appl. No.: 08/962,657

[22] Filed: Nov. 3, 1997

[30] Foreign Application Priority Data

Jun. 6, 1997 [JP] Japan ................................ 9-149692

[51] Int. Cl.⁷ .................................................. C25D 13/12
[52] U.S. Cl. ........................ 204/508; 205/316; 204/623; 204/202
[58] Field of Search .................... 204/484, 485, 204/508, 623, 471, 202; 205/316; 445/24, 49

[56] References Cited

U.S. PATENT DOCUMENTS

| | | | |
|---|---|---|---|
| 3,589,789 | 6/1971 | Hubert et al. | 316/19 |
| 5,086,297 | 2/1992 | Miyake et al. | 340/579 |
| 5,730,637 | 3/1998 | Suzuki et al. | 445/49 |
| 5,860,843 | 1/1999 | Kasahara | 445/24 |

*Primary Examiner*—Kishor Mayekar
*Attorney, Agent, or Firm*—Staas & Halsey, LLP

[57] ABSTRACT

A process for forming a fluorescent layer on an electrode disposed on a substrate for display panel includes the steps of: placing an opening of a housing section for housing a fluorescent paste opposite to the electrode on the substrate; and applying a voltage between the electrode on the substrate and a control electrode disposed inside the housing section in this state, whereby the fluorescent paste inside the housing section is exactly applied onto the electrode via the opening. Also, an apparatus for forming a fluorescent layer on a substrate for display panel using the process is disclosed.

20 Claims, 9 Drawing Sheets

PROCESS AND APPARATUS FOR FORMING FLUORESCENT LAYER ON A SUBSTRATE FOR DISPLAY PANEL

CROSS-REFERENCES TO RELATED APPLICATIONS

This application is related to Japanese Patent Application No. Hei 09(1997)-149692, filed on Jun. 6, 1997 whose priority is claimed under 35 USC §119, the disclosure of which is incorporated herein by reference in its entirety.

BACKGROUND OF THE INVENTION

1. Field of the Invention

The present invention relates to a process and apparatus for forming a fluorescent layer on a substrate for display panel. More particularly, the present invention relates to a process for forming a fluorescent layer on a substrate for display panel such as a plasma display panel (PDP) of matrix display type.

2. Description of the Related Arts

A PDP is a thin display device excellent in visibility, capable of high speed display, and facilitating a large screen display. Especially, the PDP of surface discharge type is a PDP in which display electrodes forming a pair in applying a driving voltage are arranged on the same substrate. Such a PDP is suitable for full color display using fluorescent substances.

Figure 18:
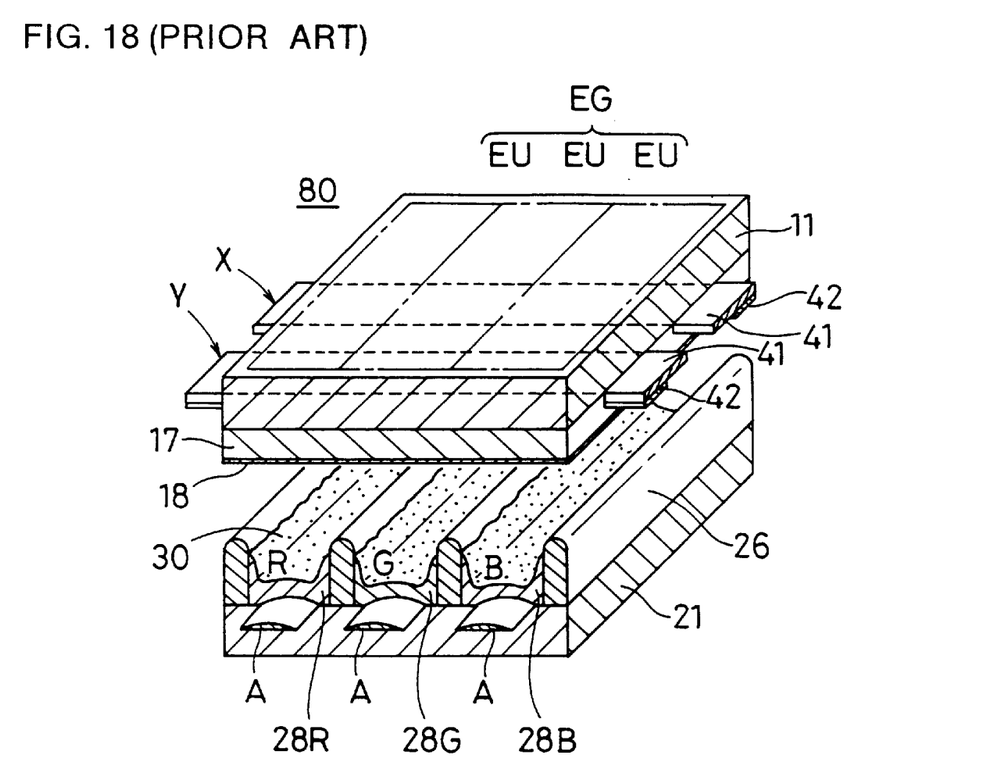
FIG. 18 is an exploded perspective view of a conventional PDP.

Conventional PDP is now explained with reference to a PDP of AC type employing a three-electrode surface discharge method capable of full color display. FIG. 18 is an exploded perspective view of a conventional PDP, which shows a portion corresponding to one pixel EG.

A PDP is constructed with a glass substrate 11 on a front side and a glass substrate 21 on a back side. First and second display electrodes X and Y, a dielectric layer 17, and a protective film 18 are formed on the glass substrate 11 of the front side. Address electrodes A, a rib (barrier rib) 26, a fluorescent layer 28R (for red), a fluorescent layer 28G (for green), and a fluorescent layer 28B (for blue) are formed on the glass substrate 21 of the back side. A discharge gas is injected in a discharge space 30 between the glass substrate 11 of the front side and the glass substrate 21 of the back side.

Each of the display electrodes X and Y is formed of a wide transparent electrode 41 and a narrow metal electrode (bus electrode) 42 for compensating for the conductivity of the transparent electrode 41.

Application of a predetermined voltage to the display electrodes X and Y induces surface discharge along the surface of the dielectric layer 17, whereby ultraviolet light emitted by the discharge gas excites the fluorescent layers 28R, 28G, and 28B to emit a visible light. The address electrodes A are arranged in a column direction for controlling the wall charge of the dielectric layer 17 by generating a discharge between the address electrodes A and the display electrode Y.

The ribs are stripe-like in a plan view (seen in a plane) and equally spaced along the extending direction of the display electrodes X and Y (in a row direction of the display screen). These ribs 26 partition the discharge space 30 into unit display elements (subpixels) EU in the row direction and allow the gap dimension of the discharge space 30 to be uniform over the entire display region.

Referring to the PDP shown in FIG. 18, the pixel EG constituting the screen consists of three subpixels EU of R (red), G (green), and B (blue) arranged in a row (line) direction. In other words, the arrangement of three colors for color display is of in-line type.

Conventionally, the fluorescent layers 28R, 28G, and 28B were formed by applying paste-like fluorescent substances (fluorescent pastes) between the ribs 26 for the three colors, followed by drying and calcination. The application of the fluorescent pastes was carried out by screen printing method.

In the screen printing method, the printing is carried out three times by using three printing plates for R, G, and B. In other words, a fluorescent paste for R is applied between the ribs 26 for R by using a plate for R before drying, then for G, and finally for B. Thus, the process of aligning the printing plate with the glass substrate 21 of the back side having the ribs thereon for applying and drying the fluorescent paste was repeated three times before the calcination step.

Such a screen printing method will require printing plates of highly fine structure and wide area according as the display panel has a highly fine structure and wide area. Since the printing plates of highly fine structure and wide area tend to elongate or bend, it is difficult to align the printing plates with the glass plate 21 of the back side. Therefore, a problem arises such that the fluorescent paste is not applied on a desired unit display region (between the ribs), causing blotting of colors and partial insufficient application of the colors.

SUMMARY OF THE INVENTION

The present invention has been made in view of these circumstances, and the purpose thereof is to provide a process and an apparatus for forming a fluorescent layer on a substrate for display panel in which a fluorescent paste of each color is applied precisely on a desired unit display region (between the ribs) for the color by applying an electric field to introduce the fluorescent paste into the unit display region (between the ribs) on the substrate.

Accordingly, the present invention provides a process for forming a fluorescent layer on a substrate for display panel, comprising the steps of: placing an opening of a housing section for housing a fluorescent paste opposite to an electrode on the substrate; and applying a voltage between the electrode on the substrate and a control electrode disposed inside the housing section in this state, whereby the fluorescent paste inside the housing section is applied on the electrode via the opening.

According to the present invention, the fluorescent paste can be precisely applied onto the electrode on the substrate for display panel, since a voltage is applied between the electrode on the substrate for display panel and the control electrode disposed inside the housing section, and the fluorescent paste inside the housing section is applied onto the electrode on the substrate for display panel via the opening.

BRIEF DESCRIPTION OF THE DRAWINGS

FIG. 10 is an explanatory view showing a state in which FIG. 9 is seen from the direction shown by arrow B.

FIG. 12 is an explanatory view showing a state in which FIG. 11 is seen from the direction shown by arrow B.

DETAILED DESCRIPTION OF THE PREFERRED EMBODIMENTS

In the present invention, the panel substrate may be a substrate on which a display electrode such as a transparent electrode made of ITO or a metal electrode has been formed. In the case where the panel substrate is a substrate for PDP, a substrate may be used such that a discharge electrode and a rib for partitioning the discharge space are formed.

The housing section may be made of any material in any shape as long as it is capable of housing fluorescent paste(s) and capable of having an opening to face the display electrode on the substrate. The control electrode may be an electrode such as a transparent electrode made of ITO or a metal electrode.

Preferably, in the case where the electrode on the substrate is formed of a plurality of parallel strip-like electrodes in the above construction, then the opening of the housing section is formed of a slit-like opening intersecting the plurality of strip-like electrodes; and the control electrode is formed of an elongated electrode having approximately the same length as the slit-like opening and being in contact with an opening surface of the slit-like opening, whereby the housing section is moved in an extending direction of the strip-like electrode in applying the fluorescent paste onto the strip-like electrode.

In the case where the panel substrate is a substrate for plasma display panel further including a plurality of strip-like ribs provided between the strip-like electrodes for partitioning the plurality of strip-like electrodes, the fluorescent paste is applied in strip-like grooves formed between the strip-like ribs.

In this case, it is desirable that one end of each strip-like rib which will be the starting side for applying the fluorescent paste has a side wall for connecting the ribs.

In the above construction, in the case where three fluorescent pastes corresponding to the three primary colors for color display are to be applied in strip-like grooves, it is desirable to prepare a housing section in which the fluorescent pastes of the three colors are housed, to reciprocate the housing section in an extending direction of the strip-like electrodes, and to successively apply each of the three fluorescent pastes on a corresponding strip-like electrode by switching the direction of the reciprocating movement. This achieves efficient application of the fluorescent pastes.

Alternatively, in applying a fluorescent paste on a strip-like electrode, the housing section may be moved in a direction intersecting the strip-like ribs to place the slit-like opening opposite to a groove between the strip-like ribs; and the fluorescent paste inside the housing section is applied into the groove by applying a voltage between the control electrode and the strip-like electrode within the groove.

The control electrode may be formed in contact with an inside wall of the housing section. The housing section may be formed of two rectangular plates which are configured in a V-shape. The two rectangular plates of the housing section are preferably inclined forward and backward relative to the direction of movement.

An outside end in an electrode-facing surface of the two rectangular plates of the housing section is preferably cut aslant. Further, the electrode-facing surface of the two rectangular plates of the housing section is preferably subjected to water-repellency treatment. This will prevent cross-talking of the fluorescent pastes.

The present invention also provides a process for forming a fluorescent layer on a plurality of electrodes disposed on a substrate for display panel, comprising the steps of: disposing a control electrode inside a housing section of a fluorescent paste, the housing section having an opening larger than the substrate for display panel, the control electrode having a size approximately equal to that of the substrate for display panel; disposing the substrate for display panel so that a surface thereof having a strip-like electrode opposes the opening of the housing section; and applying a voltage between the control electrode and the strip-like electrode for emitting a color corresponding to the fluorescent layer in this state, whereby the fluorescent paste inside the housing section is applied onto the strip-like electrode.

In the above construction, the control electrode is preferably formed of a meshed or perforated flat plate. This allows the fluorescent paste to pass smoothly through the electrode.

The housing section is preferably provided with a multi-slitted or perforated sheet on an upper surface of the fluorescent paste housed in the housing section. This allows the electric field to be concentrated on the tip of the paste filling up the opening of the sheet, so that the paste is easily raised and the fluorescent paste is smoothly applied between the ribs.

The present invention further provides an apparatus for forming a fluorescent layer in a long and narrow groove on a substrate for display panel having a plurality of strip-like electrodes and a plurality of strip-like ribs extending parallel to the electrodes to place each of the electrodes in between and defining the groove along the electrodes, the apparatus comprising: a housing section for housing a fluorescent paste, the housing section being disposed opposite to the substrate for display panel and movable in an extending direction of the ribs; and a control electrode which has a length approximately equal to that of a slit-like opening formed on a substrate-facing surface of the housing section to intersect the plurality of ribs and which is disposed in the housing to be in contact with an opening surface of the slit-like opening, whereby the fluorescent paste inside the housing section is applied via the slit-like opening into the groove between the ribs defining the strip-like electrode by applying a voltage between the control electrode within the housing section and the strip-like electrode of the substrate for display panel while moving the housing section housing the fluorescent paste in an extending direction of the ribs.

The present invention is now explained in detail by way of non-limiting examples illustrated in the drawings. Hereafter, an AC PDP of three electrode surface discharge type capable of full color display is used as an example of a display panel for explaining the process of forming a fluorescent layer on a substrate for display panel and for explaining the apparatus to be used for applying the process for forming a fluorescent layer.

Figure 1:
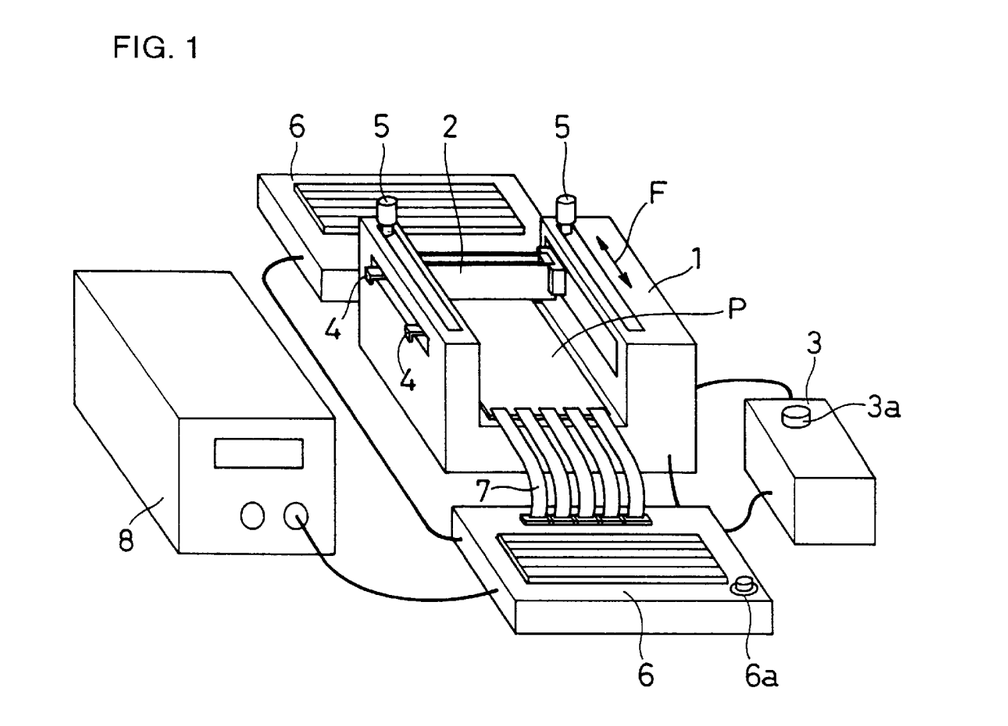
FIG. 1 is a perspective view showing a construction of an apparatus for forming a fluorescent layer according to the present invention.

FIG. 1 is a perspective view showing a construction of an apparatus for forming a fluorescent layer. Referring to FIG. 1, the reference symbol P represents a substrate for display panel. The substrate P for display panel is a glass substrate 21 of the back side on which the address electrodes A and the ribs 26 shown in FIG. 18 are formed. A fluorescent layer 28R for red, a fluorescent layer 28G for green, and a fluorescent layer 28B for blue are formed on the substrate P for the display panel by the apparatus of the present invention.

The reference numeral 1 represents a main body on which the substrate P for the display panel is mounted. A paste supplying section 2 is provided for supplying a fluorescent paste to the substrate P for the display panel. The paste supplying section 2 serves as a housing section for housing the fluorescent paste. A motor controller 3 is provided for controlling a motor (not shown because it is mounted inside the main body 1) which moves the paste supplying section 2 in a direction shown by arrow F. The motor controller 3 is equipped with a speed control knob 3a for adjusting the moving speed of the paste supplying section 2. A limiter 4 is provided for restricting the movement of the paste supplying section 2. The limiter 4 detects the movement of the paste supplying section 2 with a limit switch.

A gap adjusting sections 5 are provided for adjusting the vertical position and the inclination of the paste supplying section 2. The gap adjusting sections 5 are disposed on both sides of the paste supplying section 2. The vertical position and the inclination of the paste supplying section 2 can be adjusted by using the gap adjusting section 5 one by one.

Two controllers 6 are provided for determining which address electrode A of the substrate P for the display panel is to receive an applied voltage. The controllers 6 are provided in the front and in the rear of the paste supplying section 2 for applying a voltage to the odd-numbered and even-numbered address electrodes A, respectively. A start switch 6a is provided in one of the controllers 6 for starting the movement of the paste supplying section 2.

A flexible lead line 7 is for connecting the substrate P for the display panel and the controllers 6. A power source 8 is for applying a high voltage to the address electrodes A of the substrate P for the display panel via the controller 6.

The main body 1 and the controller 6, the main body 1 and the motor controller 3, the motor controller 3 and the controller 6, the two controllers 6 and 6, the controller 6 and the power source 8 are connected by means of respective cables.

Figure 2:
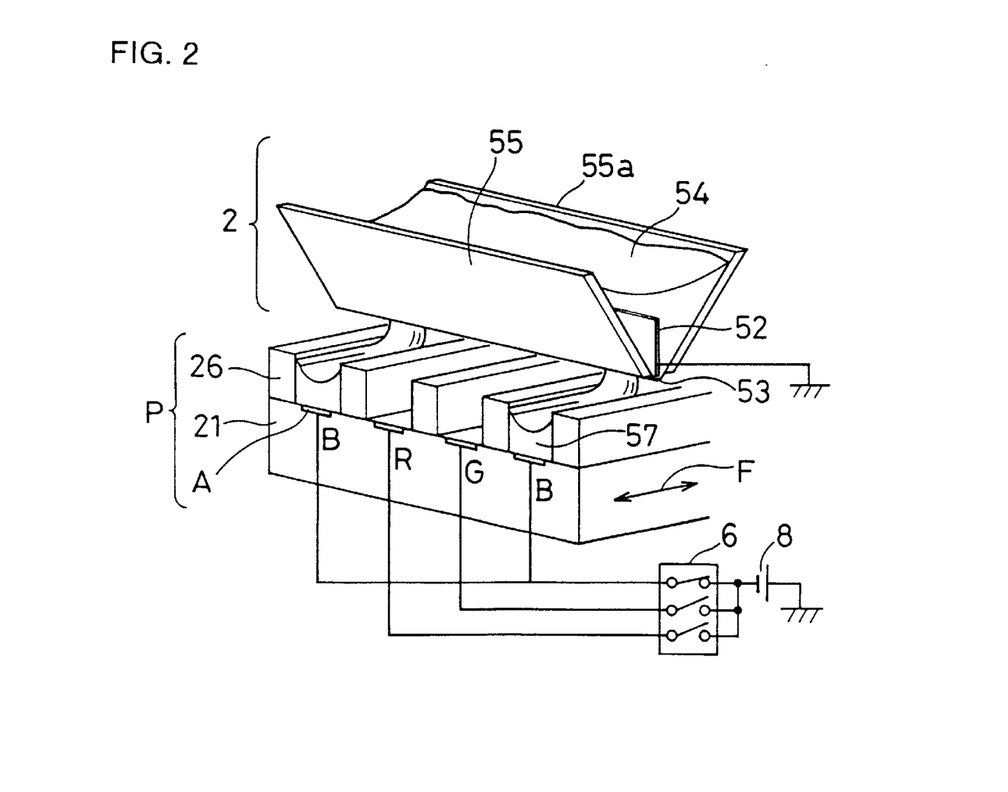
FIG. 2 is a perspective view showing a state in which a fluorescent paste is supplied according to the present invention.

FIG. 2 is a perspective view showing a state in which the fluorescent paste is supplied. As shown in FIG. 2, the paste supplying section 2 is formed of two rectangular plates 55 and 55a disposed opposite to each other to define a housing space (housing section) having a V-shaped cross section. A slit 53 is formed between the two rectangular plates 55 and 55a at a position corresponding to the tip of the V-shaped housing space. An electrode plate 52 having the same length as the slit 53 is disposed in the slit 53. The electrode plate 52 is electrically grounded.

The V-shaped housing space of the paste supplying section 2 houses a fluorescent paste 54 for emitting light of a desired color, for example, of blue in the case where a fluorescent paste for displaying blue is to be applied between the ribs. Here, the fluorescent paste 54 is exposed in the slit 53 to cover the tip of the electrode plate 52. However, surface tension provided by adjusted viscosity of the fluorescent paste 54 prevents the fluorescent paste 54 from dropping by gravity.

The address electrodes A of the substrate P for the display panel are connected to the power source 8 via the controller 6. Among the address electrodes A, only the address electrodes for blue, for example, are allowed to receive a voltage by means of the controller 6 if a fluorescent paste 54 for blue is to be applied.

The voltage applied from the power source 8 depends on the composition and viscosity of the fluorescent paste 54, the distance between the paste supplying section 2 and the address electrode A, and the like. In this Example, the voltage to be applied was set to be about 1.2 KV provided that the height of the ribs was 100 to 200 $\mu$m and the distance between the paste supplying section 2 and the upper surface of the ribs was 0.1 to 0.3 mm. The voltage to be applied may be either a direct current or an alternating current. In this Example, a voltage of plus polarity was applied to the electrode plate 52 and a voltage of minus polarity was applied to the address electrode A by utilizing a direct current. These polarities can be reversed.

The adjustment of the interval between the upper surface of the ribs 26 and the paste supplying section 2 is performed in the gap adjusting sections 5. The paste supplying section 2 is movable along the extending direction of the stripe-like ribs 26 in a direction shown by arrow F. The blue fluorescent paste 54 is uniformly applied between the ribs by moving the paste supplying section 2 at a predetermined speed in a direction shown by arrow F with the voltage applied between the electrode plate 52 and the address electrode A.

After the application of the blue fluorescent paste 54 has been completed, the paste supplying section 2 for housing the blue fluorescent paste 54 is replaced with the one for housing the red fluorescent paste 54; the voltage is applied only to the address electrodes A for R among the group of address electrodes by the controller 6; and the paste supplying section 2 is moved again in the direction shown by arrow F. Further, after the application of the red fluorescent paste 54 has been completed, the paste supplying section 2 for housing the red fluorescent paste 54 is replaced with the one for housing the green fluorescent paste 54; the voltage is applied only to the address electrodes A for G among the group of address electrodes by the controller 6; and the paste supplying section 2 is moved again in the direction shown by arrow F. This completes application of the fluorescent pastes 54 for the three colors into the intervals for the respective colors between the ribs 26.

Further, drying and calcination of the fluorescent pastes 54 completes the formation of the fluorescent layer 28B for blue, the fluorescent layer 28R for red, and the fluorescent layer 28G for green.

Figure 3:
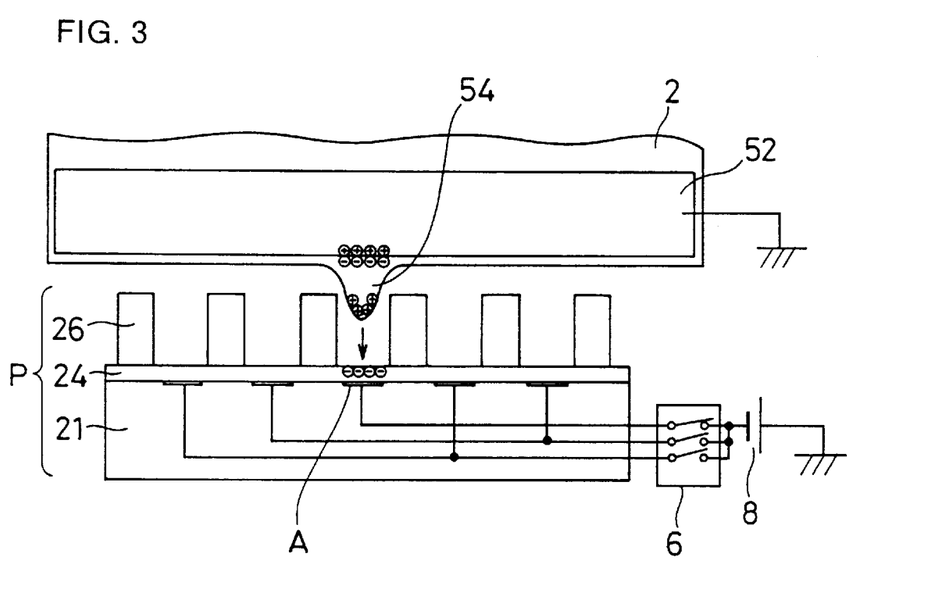
FIG. 3 is an explanatory view showing the principle of applying a fluorescent paste by applying a voltage according to the present invention.

FIG. 3 is an explanatory view showing a principle of applying a fluorescent paste by applying a voltage. In the present invention, as shown in FIG. 3, a fluorescent paste 54 is applied onto an address electrode between the ribs 26 by allowing an electric field to act on the fluorescent paste 54. This is based on the following principle.

Namely, a gap is provided between the paste supplying section 2 and an insulating layer 24 (not shown in FIG. 2) formed on the address electrode A. Application of an electric field between the electrode plate 52 and the desired address electrode A allows lines of electric force to be generated from the tip of the slit of the paste supplying section 2 to the bottom portion between the ribs 26. This induces or injects electric charge in the fluorescent paste 54 exposed in the slit, causing the fluorescent paste 54 to be raised at that portion. When the tip of the raised portion of the fluorescent paste 54 touches the bottom portion between the ribs, the fluorescent paste 54 fills the groove between the ribs 26 like a flow by wetting. Since the electric field can be locally generated by selecting the electrode, the fluorescent paste 54 can be applied to an arbitrary position between the ribs.

In other words, the principle of the present invention allows a fluorescent paste to be selectively applied onto a desired address electrode A by electric field attraction force.

Performing a series of these operations respectively for the fluorescent paste of blue, the fluorescent paste of red, and the fluorescent paste of green completes application of the fluorescent pastes 54 for the three colors into respective intervals between the ribs. Further, calcination of these fluorescent pastes completes formation of the fluorescent layer 28B for blue, the fluorescent layer 28R for red, and the fluorescent layer 28G for green.

Figure 4:
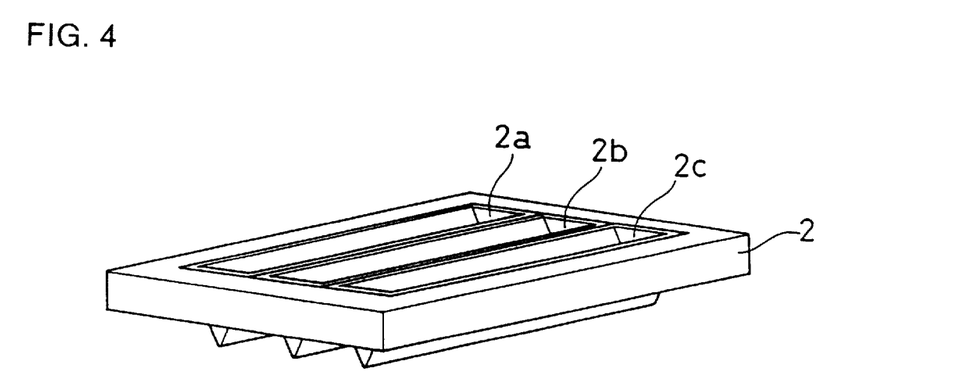
FIG. 4 is an explanatory view showing an example of a paste supplying section having fluorescent paste housing sections for three colors according to the present invention.

FIG. 4 is an explanatory view showing an example of a paste supplying section having fluorescent paste housing sections for the three colors.

Three paste supplying sections 2, each for one color, may be provided and exchanged color by color, as described above. Alternatively, however, one integrated paste supplying section 2 incorporating the three colors may be provided which includes a paste supplying section 2a for B loaded with a fluorescent paste 54 for blue, a paste supplying section 2b for R loaded with a fluorescent paste 54 for red, and a paste supplying section 2c for G loaded with a fluorescent paste 54 for green, as shown in FIG. 4.

When such an integrated paste supplying section 2 for three colors is used, the need for exchanging the paste supplying sections 2 is eliminated. Thus, the fluorescent paste 54 of each color can be applied into its respective predetermined interval between the ribs 26 by successively applying a voltage to an electrode plate 52 for B in a fluorescent paste reservoir of the paste supplying section 2a for B, to an electrode plate 52 for R in a fluorescent paste reservoir of the paste supplying section 2b for R, and to an electrode plate 52 for G in a fluorescent paste reservoir of the paste supplying section 2c for G, and by selecting the respective address electrode correspondingly.

Therefore, the fluorescent pastes 54 for the three colors may be applied into respective intervals between the ribs 26 by moving the integrated paste supplying section 2 for the three colors parallel to the substrate P for the display panel one and a half times if the color of the fluorescent paste 54 is switched every time the paste supplying section 2 is moved along the substrate P for the display panel from one end to the other end.

Figure 5:
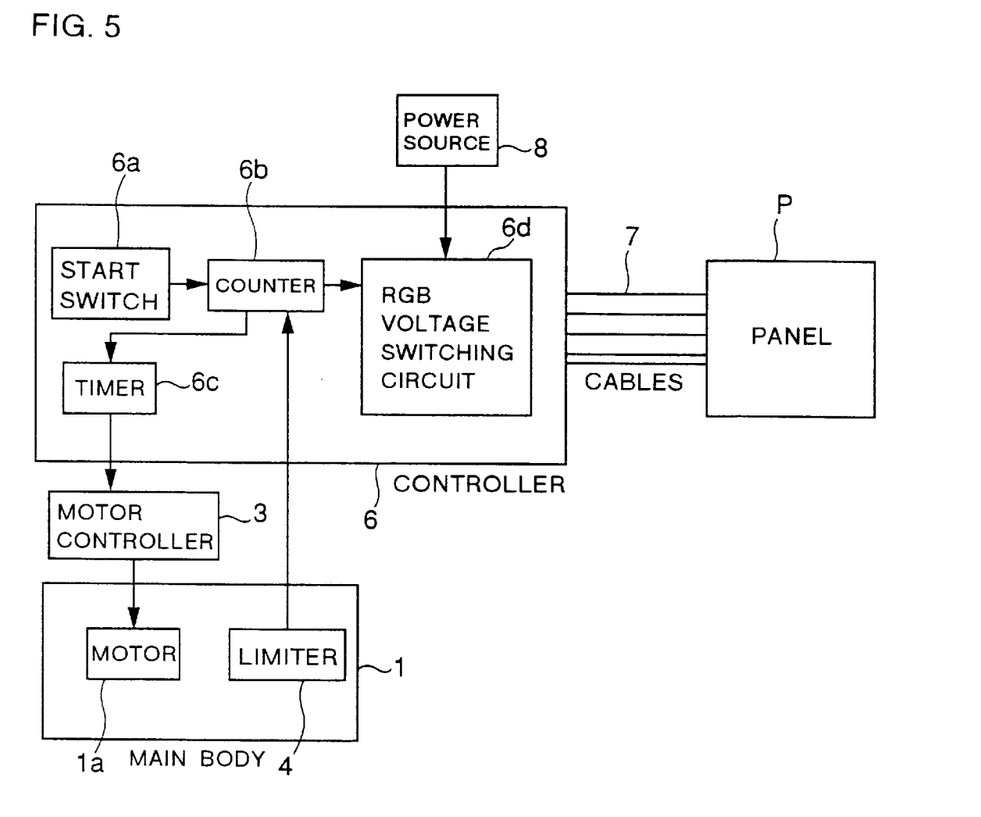
FIG. 5 is a circuit block diagram showing an electric circuit in an apparatus for forming a fluorescent layer according to the present invention.

FIG. 5 is a circuit block diagram showing an electric circuit in the apparatus for forming a fluorescent layer. Referring to FIG. 5, the controller 6 includes a start switch 6a, a counter 6b, a timer 6c, and an RGB voltage switching circuit 6d; and the main body 1 includes a motor 1a and a limiter 4.

When the start switch 6a is turned on, the counter 6b issues a command to the RGB voltage switching circuit 6d for instructing what address electrode A should receive an applied voltage, and issues a start command to the timer 6c.

The timer 6c does not issue a command to the motor controller 3 immediately but issues a command to the motor controller 3 for driving the motor 1a at an appropriate time after two or three seconds. This is due to the following reason. At an early stage of applying a voltage, the previously applied fluorescent paste 54 is not yet fixed between the ribs 26. The above-mentioned time lag of two or three seconds is for allowing the applied fluorescent paste to be firmly fixed between the ribs before moving the paste supplying section 2.

When the timer 6c issues a command to the motor controller 3 after the predetermined period of time, the motor 1a is driven by the motor controller 3 to move the paste supplying section 2. The paste supplying section 2 moves to one end of the main body 1 while applying a fluorescent paste 54 of the presently selected color between the ribs 26. When the limiter 4 is actuated, the limiter 4 issues a command to the counter 6b, which in turn issues a command to the RGB voltage switching circuit 6d for switching the address electrode A, and also issues a start command to the timer 6c for driving the motor 1a.

In the substrate P for the display panel, a voltage is applied by the power source 8 only on the address electrode A selected by the RGB voltage switching circuit 6d. The fluorescent paste for each of the three colors can be applied into an arbitrary interval between the ribs by repeatedly carrying out a series of these steps for blue, red, and green.

Figure 6A:
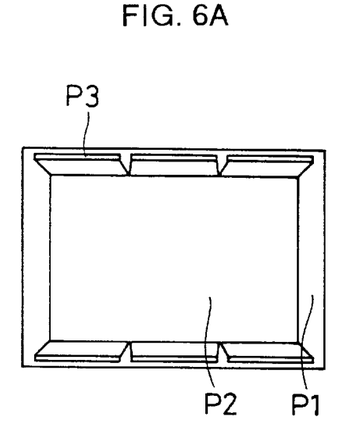
FIG. 6A is an explanatory view showing a form of a substrate for display panel to be used in the present invention.
Figure 6B:
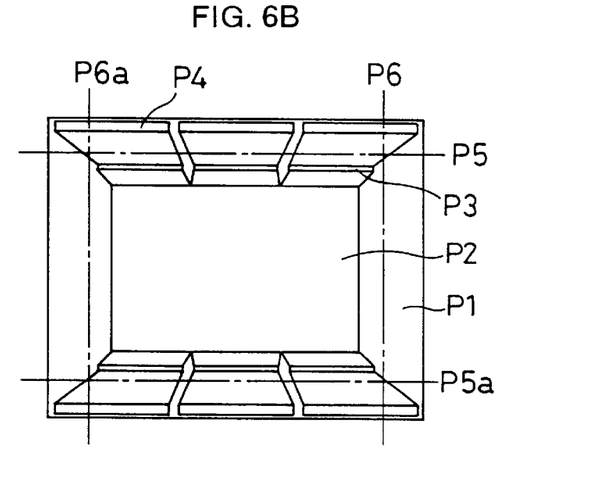
FIG. 6B is an explanatory view showing a form of a substrate for display panel to be used in the present invention.

FIGS. 6A and 6B are explanatory views showing forms of the substrate for display panel. For comparison, an overall view of the conventional substrate P for the display panel is shown in FIG. 6A, whereas the overall view of the substrate P for the display panel of the present invention is shown in FIG. 6B.

As shown in these Figures, the conventional substrate P for the display panel is formed of a substrate P1, a rib pattern portion P2, and an external electrode pattern group P3, whereas the substrate P for the display panel of the present invention further includes an electrode pattern group P4 which is positioned outside the external electrode pattern group P3 and which has a wider electrode pitch to facilitate the wiring connection for applying an electric field.

The substrate size is larger than that of the conventional one because the electrode pattern group P4 has been formed. However, by forming cut portions P5, P5a and P6, P6a, after completing the fluorescent layer or the panel, it is possible to prevent deterioration of the property and shape observed in the conventional case.

Thus, the wiring connection for applying an electric field is facilitated and the period of time required for applying the fluorescent paste is shortened by forming, outside the external electrode pattern group P3, the electrode pattern group P4 for applying the electric field.

Figure 7:
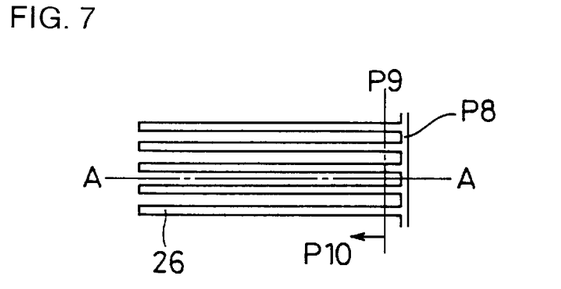
FIG. 7 is an explanatory view showing a form of ribs on a substrate P for display panel according to the present invention.

FIG. 7 is an explanatory view showing a form of the ribs on the substrate P of the display panel. Referring to FIG. 7, the reference numeral 26 represents a rib, and P8 is a wall for connecting the ends of the ribs 26. P9 shows a center position of the slit 53 of the paste supplying section 2 in a stationary state (the position for starting the application of the paste) before moving the paste supplying section 2. P10 shows a direction of moving the paste supplying section 2. Thus, in the substrate P for the display panel according to this embodiment, the ends of the ribs 26 on a side for starting the application of the paste are connected by the wall P8.

Figure 8:
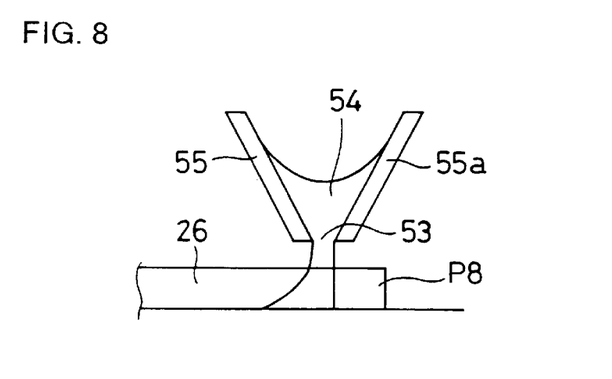
FIG. 8 is an explanatory view showing a cross section along the A—A line of FIG. 7.

FIG. 8 is an explanatory view showing a cross section along the A—A line of FIG. 7. As shown in FIG. 7, the widening by wetting of the fluorescent paste 54 is inhibited and the application of the paste into an adjacent interval between the ribs is prevented by forming a wall P8 at the ends of the ribs 26 on a side for starting the application of the paste to close the opening between the ribs.

Figure 9:
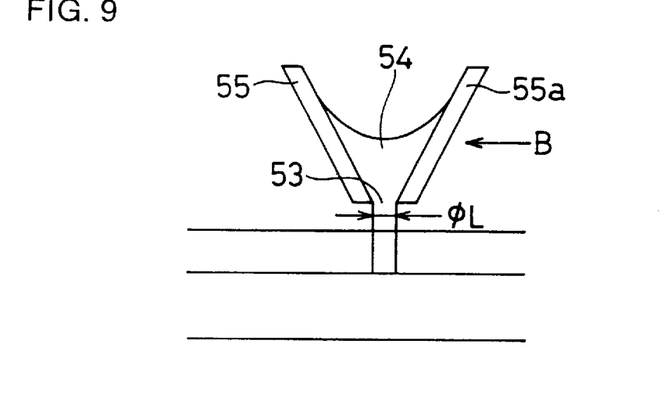
FIG. 9 is a view corresponding to FIG. 8 in which no walls are provided at the end of the ribs.
Figure 10:
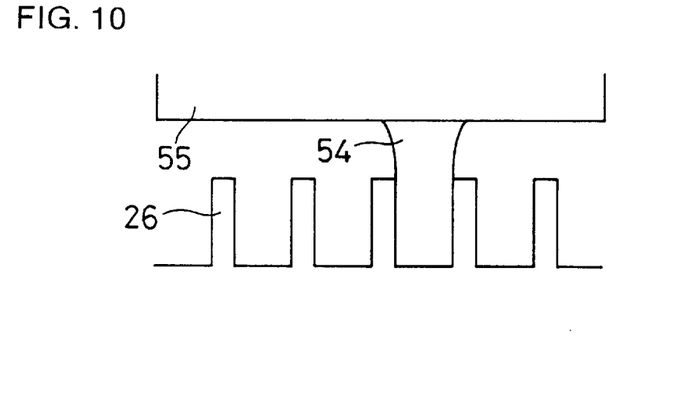
Figure 11:
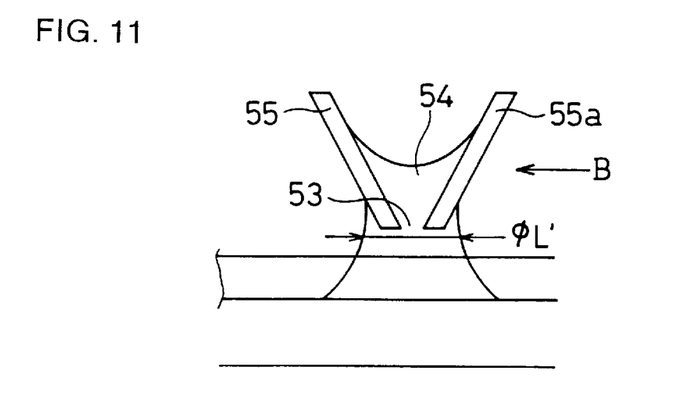
FIG. 11 is an explanatory view showing a state after several seconds from FIG. 9.
Figure 12:
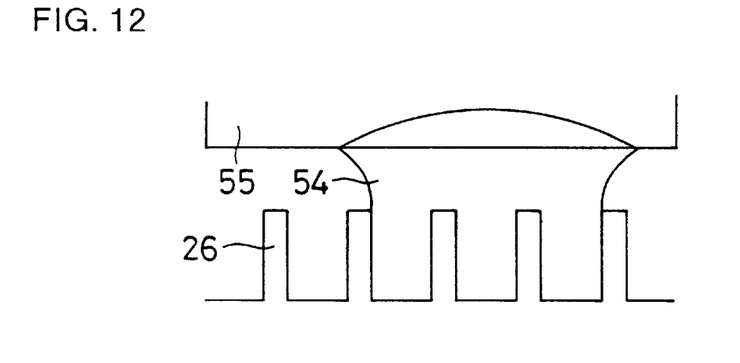

In order to demonstrate this effect, an embodiment in which such wall P8 is not provided at the ends of the ribs 26 is shown in FIGS. 9 to 12. FIG. 9 is a view corresponding to FIG. 8 in which no walls P8 are provided at the end of the rib 26. FIG. 9 shows a state immediately after the fluorescent paste 54 is transferred into an interval between the ribs. FIG. 10 is an explanatory view showing a state in which FIG. 9 is seen from the direction shown by arrow B. FIG. 11 is an explanatory view showing a state after several seconds from FIG. 9. FIG. 12 is an explanatory view showing a state in which FIG. 11 is seen from the direction shown by arrow B.

As shown in FIGS. 9 and 10, in the case where the walls P8 are not provided at the ends of the ribs 26 on a side for starting the application of the paste, the fluorescent paste 54 is transferred from the slit 53 into an interval between the ribs by application of the electric field, thereby forming a paste pillar. After several seconds therefrom, the fluorescent paste 54 widens by wetting along the wall surface of the ribs 26 and, finally, widens over the end of the rib onto the substrate where no ribs are present. Therefore, several seconds after the fluorescent paste 54 has been transferred, the diameter L of the pillar of the fluorescent paste 54 at the tip of the slit 53 will increase to become a diameter L' as shown in FIG. 11, whereby the fluorescent paste 54 will be applied into an adjacent interval between the ribs where no electric field is applied, as shown in FIG. 12.

On the other hand, in the case where a wall P8 is formed at the ends of the ribs 26 on a side for starting application of the paste as in this embodiment, the widening of the fluorescent paste 54 by wetting is inhibited by the wall P8 and the fluorescent paste 54 does not pass over the ends of the ribs, whereby the application of the fluorescent paste into an adjacent interval between the ribs is prevented.

Alternatively, the wall P8 may be provided alternately at both ends of the ribs. This realizes back and forth movement of the paste supplying section shown in FIG. 4 in applying the fluorescent paste, since the position for starting the application of the paste can be set on both sides of the ribs.

Also, the wall P8 may be provided on both sides of each rib (i.e. on both sides of each interval between two ribs). However, in such a case, the discharge space between the ribs is completely closed, so that a problem of poor ventilation will occur in a step of exhausting a gas within the panel or in a step of injecting a discharge gas after the panel is assembled.

Figure 13:
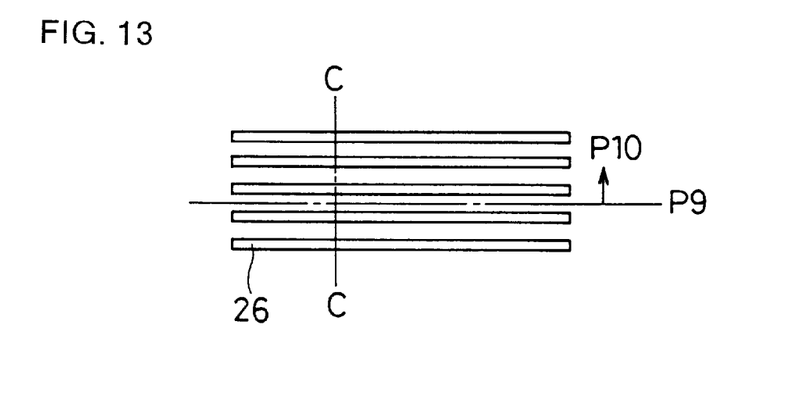
FIG. 13 is an explanatory view showing an embodiment in which the paste supplying section is translated in a direction perpendicular to the ribs according to the present invention.
Figure 14:
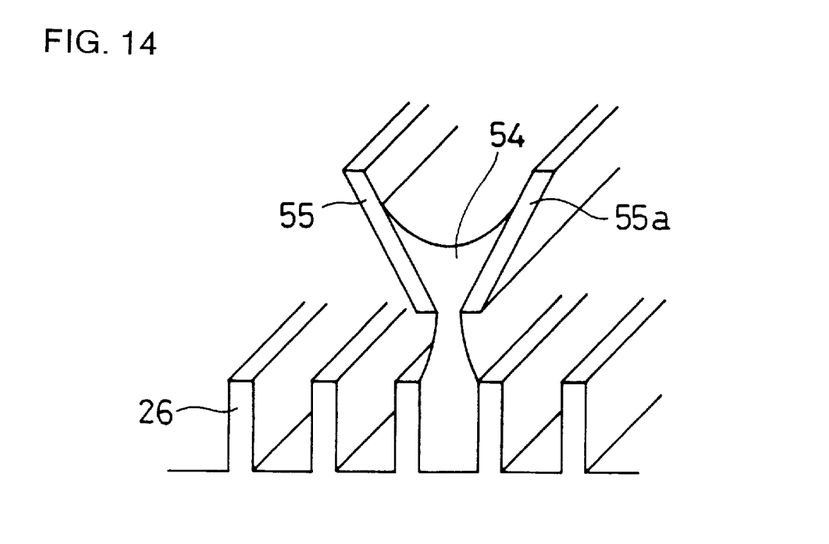
FIG. 14 is a perspective view showing a cross section along the C—C line of FIG. 13.

FIG. 13 is an explanatory view showing an embodiment in which the paste supplying section is disposed parallel to the ribs and is moved in a direction perpendicular to the ribs (i.e. in a direction of rib arrangement). Referring to FIG. 13, P9 shows a center position of the slit 53 in the paste supplying section 2 in a stationary state before starting the movement, and P10 shows the direction of moving the paste supplying section 2. FIG. 14 is a perspective view showing a cross section along the C—C line of FIG. 13. FIG. 14 shows a state in which the fluorescent paste 54 is applied into an interval between the ribs 26.

As shown in these Figures, a paste supplying section 2 having a slit which is as long as or slightly shorter than the ribs may be translated (i.e. moved without rotation) in a direction of the arrangement of the ribs 26. The fluorescent paste 54 is applied into the whole of an interval between the ribs by applying a voltage and stopping the voltage application between the electrode plate 52 and an appropriate address electrode A at a position where the slit of the paste supplying section 2 and the address electrode are located opposite to each other (at the fluorescent paste application position). In this case, the paste pillar of the fluorescent paste 54 disappears as soon as the application of the voltage is stopped. After the application, the paste supplying section 2 is translated in a direction perpendicular to the ribs 26 to a fluorescent paste application position of the same color corresponding to the next display line for carrying out a similar voltage applying/stopping operation. This operation is repeated to apply the fluorescent paste of the same color successively into a plurality of intervals between the ribs 26 on the substrate P of the display panel.

Figure 15:
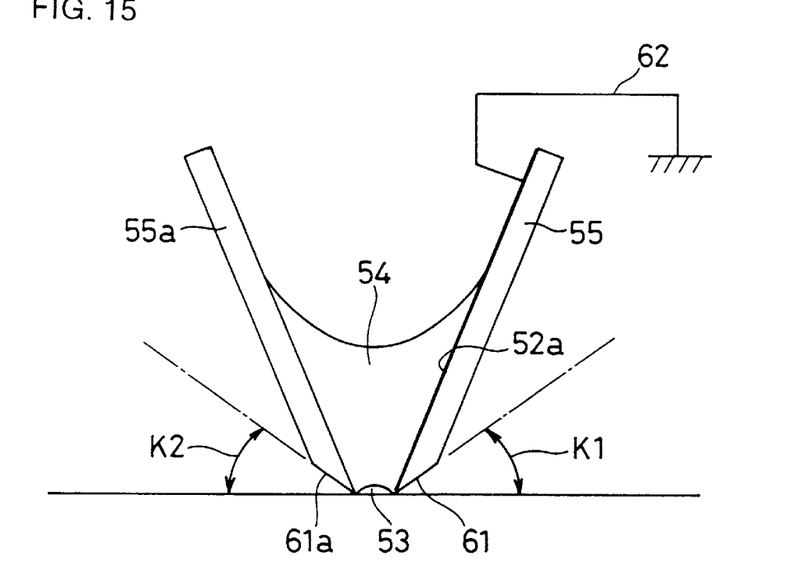
FIG. 15 is an explanatory view showing a modified example of the paste supplying section according to the present invention.

FIG. 15 is an explanatory view showing a modified example of the paste supplying section 2. Referring to FIG. 15, the reference numeral 52a represents an electrode plate. K1 and K2 show a cut angle of the rectangular plate 55 and the rectangular plate 55a, respectively. The reference numerals 61 and 61a show a Teflon layer (a Teflon coat) formed on a cut surface of the tip of the rectangular plate 55 and the rectangular plate 55a, respectively, and 62 shows a wiring from the electrode plate 52a.

The rectangular plate 55 and the rectangular plate 55a were formed of glass. Although the electrode plate 52a was formed of ITO in this example, the electrode plate 52a may as well be formed of thin film by deposition of metal, by a film thickness method in which a silver paste dispersed in a low melting point glass is applied and calcined, or a like method. An electrode may be formed on both of the rectangular plate 55 and the rectangular plate 55a.

The cut angle at the tip of the rectangular plates 55 and 55a is preferably more than or equal to 30°. If the cut angle is less than 30°, the above-mentioned cross talk is liable to be generated due to widening of the fluorescent paste by wetting. The Teflon layers 61 and 61a formed at each of the cut surfaces at the tip of the rectangular plates 55 and 55a are for water-repellency treatment and promotes the effect of preventing the cross talk of the fluorescent paste.

Figure 16:
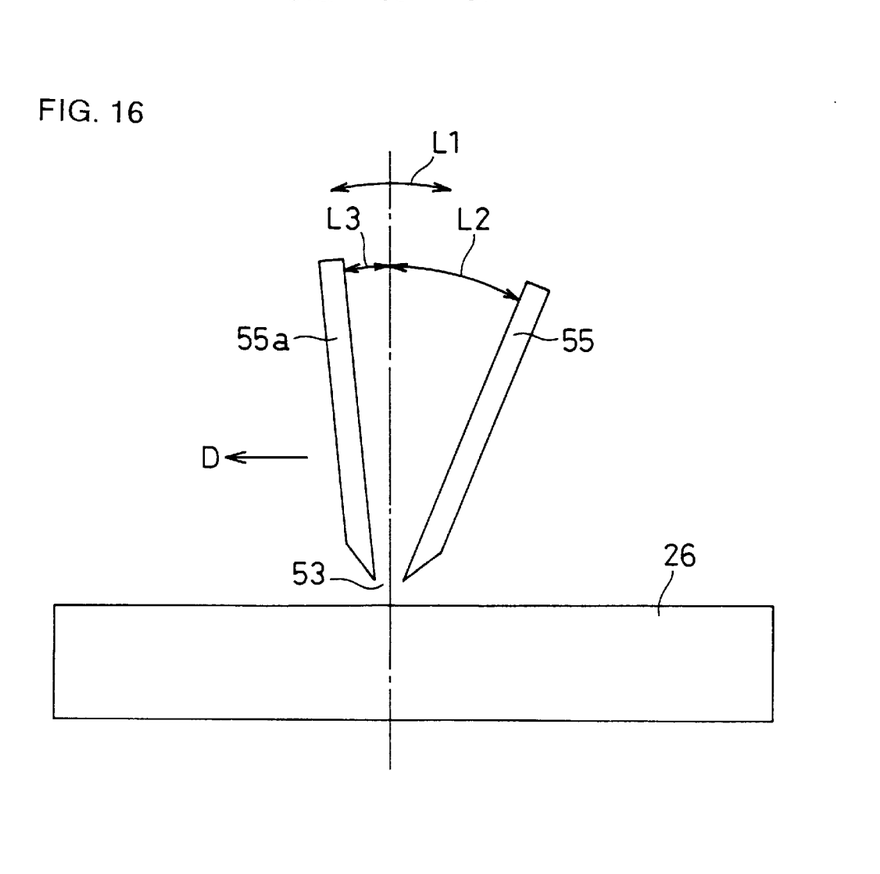
FIG. 16 is an explanatory view showing an embodiment in which the paste supplying section is inclined according to the present invention.

FIG. 16 is an explanatory view showing an embodiment in which the paste supplying section is inclined. Referring to FIG. 16, L1 represents an angle formed between the rectangular plates 55 and 55a; and L2 and L3 represent an angle of inclination of the rectangular plates 55 and 55a relative to the vertical line, respectively. The angles of inclination L2 and L3 of the rectangular plates 55 and 55a need to be optimized on the basis of the viscosity of the fluorescent paste 54, the moving speed of the paste supplying section 2, and the like. In this embodiment, the angle L1 formed between the rectangular plates 55 and 55a was set at 30°; the angle of inclination L3 of the rectangular plate 55 relative to the vertical line was set at 10°; and the angle of inclination L2 of the rectangular plate 55a relative to the vertical line was set at 20°.

Since the paste supplying section 2 moves in a direction shown by arrow D in FIG. 16, the speed of widening of the fluorescent paste 54 by wetting is relatively different between the front portion and the rear portion of the slit 53. Therefore, the margin for preventing the above-mentioned cross talk of the fluorescent paste can be set to be wider by suitably adjusting the inclination angles L2 and L3 of the rectangular plates 55 and 55a relative to the vertical line and the angle L1 formed between the rectangular plates 55 and 55a.

Figure 17:
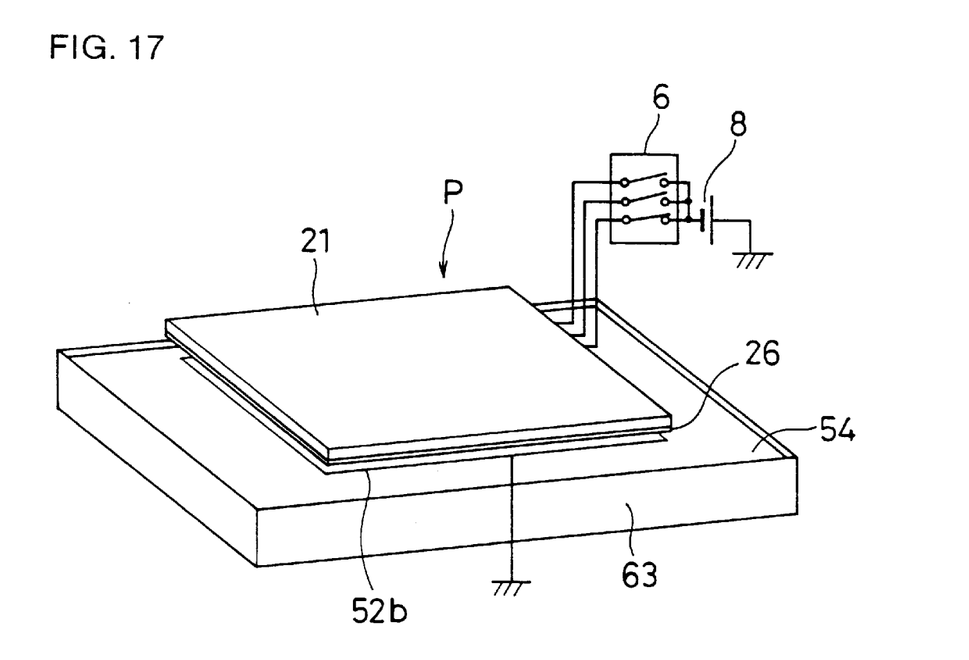
FIG. 17 is an explanatory view showing a process of applying a fluorescent paste between the ribs at a time according to the present invention.

FIG. 17 is an explanatory view showing a process of applying a fluorescent paste between the ribs at a time. In the apparatus for forming a fluorescent layer shown in FIG. 1, the paste supplying section 2 was moved in an extending direction of the ribs or in an arrangement direction of the ribs to apply a fluorescent paste between the ribs. However, as an alternative embodiment, a fluorescent paste 54 held in a tray 53 may be prepared and the substrate P for the display panel may be positioned upside down and close to the tray 63 so that the surface on which the ribs are formed may oppose to the tray for applying a voltage to the address electrodes A, as shown in FIG. 17.

The tray 63 has a size such that the substrate P of the display panel can be housed therein. A fluorescent paste 54 of a desired color is pooled in the tray 63. An electrode plate 52b is disposed over an upper surface of the pooled fluorescent paste 54 so that the entire electrode plate 52b may be covered with the fluorescent paste 54.

The substrate P for the display panel is turned upside down and brought closer to the tray 63 over the fluorescent paste 54. The substrate P for the display panel is disposed at a distance from the fluorescent paste 54 and the electrode plate 52b. In this state, a voltage is applied between the electrode plate 52b and the selected address electrodes A, whereby the fluorescent paste 54 is applied by attraction to the address electrodes A between the ribs where the voltage is applied. The viscosity of the applied fluorescent paste 54 is adjusted in advance so that the fluorescent paste may be held between the ribs by surface tension. Therefore, the fluorescent paste 54 does not fall off by gravity.

Subsequently, the substrate P for the display panel is successively moved to a tray 63 that pools the fluorescent paste 54 of another color. The repetition of the above process allows the fluorescent pastes 54 of three colors to be applied into respective intervals between the ribs 26.

The electrode plate 52b is fabricated with a meshed or perforated flat plate. This allows the fluorescent paste to pass smoothly through the electrode plate.

Alternatively, a multi-slitted or perforated sheet is provided on an upper surface of the fluorescent paste 54. This allows the electric field to be concentrated on the tip of the fluorescent paste filling up the slit-like or hole-like opening of the sheet, so that the paste is easily raised and the fluorescent paste is smoothly applied between the ribs 26.

Thus, the fluorescent paste applied into intervals (grooves) between the ribs by attraction to the address electrodes disposed between the ribs on the substrate. Therefore, the positioning of the fluorescent pastes of the three colors with respect to the grooves formed between the ribs will be accurate, so that no blotting is caused between the fluorescent pastes. Also, since the amount of applied fluorescent paste is constant all over the surface, the thickness of the fluorescent layer after calcination is also constant on the surface. As a result of this, emission of light from the completed panel will be uniform on the surface.

According to the present invention, a voltage is applied between the control electrode disposed in the housing section and the electrode on the panel substrate, and the fluorescent paste in the housing section is applied onto corresponding electrodes on the panel substrate via an opening. Therefore, the fluorescent paste is applied accurately on the electrodes of the panel substrate. Also, since the amount of applied fluorescent paste is constant, the thickness of the fluorescent layer after calcination is constant, so that the emission of light from the completed display panel is uniform in the surface.

What we claim is:

1. A process for forming a fluorescent layer on an electrode disposed on a substrate for a display panel, comprising:

placing an opening of a housing section housing a fluorescent paste opposite to the electrode on the substrate; and applying a voltage between the electrode on the substrate and a control electrode disposed inside the housing section, to thereby cause the fluorescent paste inside the housing section to be applied onto the electrode via the opening.

2. A process for forming a fluorescent layer on a substrate for a display panel according to claim 1, wherein the electrode on the substrate is formed of a plurality of parallel strip electrodes;

the opening of the housing section is formed of a slit opening traversing the plurality of strip electrodes;

the control electrode is formed of an elongated electrode having approximately a same length as the slit opening and being in contact with an opening surface of the slit opening; and the process further comprises moving the housing section in an extending direction of the strip electrode in applying the fluorescent paste onto the strip electrode.

3. A process for forming a fluorescent layer on a substrate for a display panel according to claim 2, wherein the substrate includes a plurality of strip ribs provided between the strip electrodes for partitioning the plurality of strip electrodes and the fluorescent paste is applied in strip grooves formed between the strip ribs.

4. A process for forming a fluorescent layer on a substrate for a display panel according to claim 3, wherein one end of each strip rib which will be a starting side for applying the fluorescent paste has a side wall for connecting the ribs.

5. A process for forming a fluorescent layer on a substrate for a display panel according to claim 2, wherein the housing section includes three fluorescent pastes corresponding to three primary colors for color display and is reciprocated in an extending direction of the strip electrodes to successively apply each of the three fluorescent pastes on a corresponding strip electrode by switching direction of a reciprocating movement.

6. A process for forming a fluorescent layer on a substrate for a display panel according to claim 2, wherein the housing section is formed of two rectangular plates which are configured in a V-shape, the two rectangular plates being inclined forward and backward relative to direction of movement.

7. A process for forming a fluorescent layer on a substrate for a display panel according to claim 2, wherein the housing section is formed of two rectangular plates which are configured in a V-shape, and an outside end in surfaces of the two rectangular plates facing the electrode on the substrate is cut aslant.

8. A process for forming a fluorescent layer on a substrate for a display panel according to claim 2, wherein the housing section is formed of two rectangular plates which are configured in a V-shape, and surfaces of the two rectangular plates facing the electrode on the substrate is subjected to water-repellency treatment.

9. A process for forming a fluorescent layer on a substrate for a display panel according to claim 1, wherein the electrode on the substrate is formed of a plurality of strip electrodes disposed between a plurality of strip ribs;

the opening of the housing section is formed of a slit opening parallel to the strip ribs;

the control electrode is formed of an elongated electrode having approximately a same length as the slit opening and being in contact with an opening surface of the slit opening;

the process further comprising:

moving the housing section in a traversing direction of the strip ribs to place the slit opening opposite to a groove between the strip ribs; and applying the fluorescent paste inside the housing section into the groove by applying a voltage between the control electrode and the stip electrode within the groove.

10. A process for forming a fluorescent layer on a substrate for a display panel according to claim 1, wherein the control electrode is formed in contact with an inside wall of the housing section.

11. A process for forming a fluorescent layer on a plurality of electrodes disposed on a substrate for a display panel, comprising:

disposing a control electrode inside a housing section housing a fluorescent paste, the housing section having an opening larger than the substrate, the control electrode having a size approximately equal to that of the substrate;

disposing the substrate so that a surface thereof having a strip electrode opposes the opening of the housing section; and applying a voltage between the control electrode and the strip electrode for emitting a color corresponding to the fluorescent layer, thereby causing the fluorescent paste inside the housing section to be applied onto the strip electrode.

12. A process for forming a fluorescent layer on a substrate for a display panel according to claim 11, wherein the control electrode is formed of a meshed or perforated flat plate.

13. A process for forming a fluorescent layer on a substrate for a display panel according to claim 11, wherein the housing section is provided with a multi-slitted or perforated sheet on an upper surface of the fluorescent paste housed in the housing section.

14. An apparatus for forming a fluorescent layer in a long and narrow groove on a substrate for a display panel having a plurality of strip electrodes and a plurality of strip ribs extending parallel to the electrodes to place each of the electrodes in between and defining a groove along the electrodes, the apparatus comprising:

a housing section housing a fluorescent paste, the housing section disposed opposite to the substrate and movable in an extending direction of the ribs;

a control electrode which has a length approximately equal to that of a slit opening formed on a substrate-facing surface of the housing section to traverse the plurality of ribs and which is disposed in the housing section to be in contact with an opening surface of the slit opening to thereby cause the fluorescent paste inside the housing section to be applied via the slit opening into the groove between the ribs defining the strip electrode by applying a voltage between the control electrode within the housing section and the strip electrode of the substrate for display panel while moving the housing section housing the fluorescent paste in an extending direction of the ribs.

15. A process comprising:

providing an electrode disposed on a substrate; and applying a voltage between the electrode on the substrate and a control electrode such that a fluorescent paste between both electrodes is applied on the electrode disposed on the substrate.

16. The process according to claim 15, wherein the control electrode is formed of an elongated electrode.

17. The process according to claim 15 wherein the substrate includes a plurality of strip ribs and the electrode on the substrate includes a plurality of strip electrodes.

18. The process of claim 15 wherein a housing section houses the fluorescent paste with an opening on the bottom of the housing section, the opening located over the substrate.

19. An apparatus for forming a fluorescent layer on a substrate for a display panel comprising:

a housing section housing a fluorescent paste, the housing section disposed opposite to the substrate and movable across the substrate, said housing section being formed of two rectangular plates which are configured in a V-shape with a slit opening on the bottom; and a control electrode disposed in the housing section having the same length as the slit opening.

20. The apparatus of claim 19, wherein the control electrode in the housing section is capable of causing a voltage between the control electrode and an electrode on the substrate which results in the fluorescent paste being applied on the electrode disposed on the substrate.

* * * * *